Patented Mar. 23, 1948

2,438,279

UNITED STATES PATENT OFFICE 2,438,279

ELECTRODE HOLDER

James D. Forney, Fort Collins, Colo.

Application June 24, 1946, Serial No. 678,789

3 Claims. (Cl. 219—8)

This invention relates to improvements in electrode holders of the type employed in connection with welding electrodes.

Electric welding has become very popular and many holders have been invented to support the electrodes during the welding operation.

There are two kinds of electric welding; one where the arc between two carbon electrodes is depended on to produce the heat, the arcing electrodes being held in close proximity to the work. This form of welding is sometimes referred to as "brazing." The intensity of heat generated by the arc varies with the distance between the electrode points and it is therefore desirable to have a holder that permits the electrode points to be spaced apart so as to get the best arc for the purpose for which the arc is employed.

There is also another form of electric welding in which a single electrode is employed, the work operated on being grounded. This form of welding is sometimes referred to as "soldering" and employs only a single electrode which need not be adjustable with respect to the handle.

It is an object of this invention to produce a simple electrode holder that shall be of light weight and of such construction that it can be used for either form of welding.

Another object is to produce an electrode holder that shall be provided with means for holding two electrodes in such a manner that their tips may be readily adjusted during operation.

A further object is to produce an electrode holder in which one of the electrode supporting clamps can be disconnected and the corresponding conductor from the welding transformer grounded to the work operated on.

The above and other objects that may become apparent as the description proceeds are attained by means of a construction and an arrangement of parts that will now be described in detail and for this purpose reference will be had to the accompanying drawing in which the invention has been illustrated, and in which:

Figure 5 is a section showing one form of connector for readily securing and detaching one of the conductor leads from the transformer;

Figure 6 is a section taken on line 6—6, Figure 2; and

Figure 7 is a diagrammatic representation showing the manner in which the holder is employed in connection with electric "soldering" operations.

Figure 1:
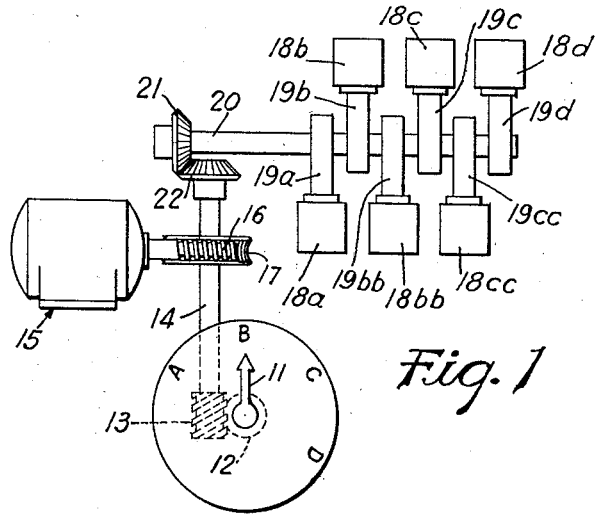
Figure 1 is a side elevation with parts broken away and other parts shown in section so as to better disclose the construction.

In the drawing reference numeral 10 designates a tubular handle which is made from conducting material, preferably copper. One end of the handle is provided with an electric insulator 11 through which an electric conductor 12 of rectangular cross section extends. Another insulator 13 may be provided near the rear end of the handle. For the purpose of simplifying the explanation, the end of the handle towards the right in Figures 1 and 2 will be referred to as the front end.

Figure 2:
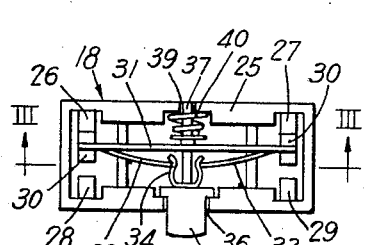
Figure 2 is a section taken on line 2—2, Figure 1.
Figure 3:
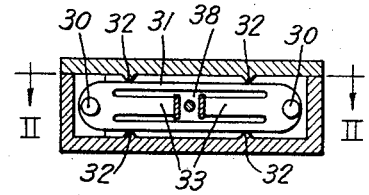
Figure 3 is a transverse section taken on lines 3—3, Figures 1 and 2.
Figure 4:
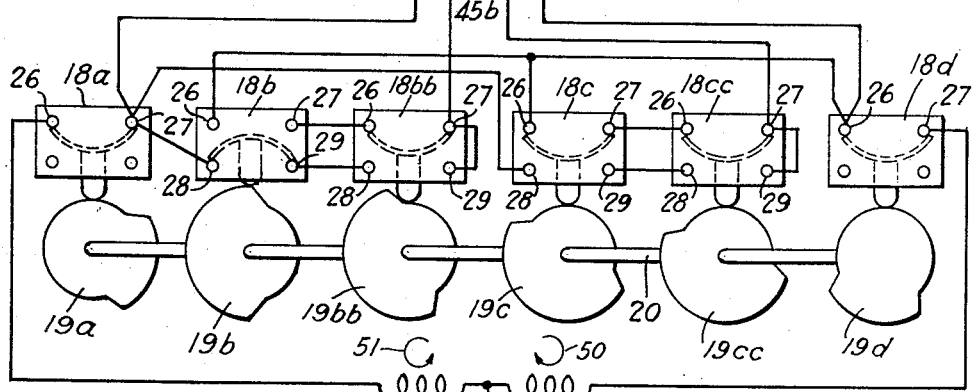
Figure 4 is an end elevation looking in the direction of arrows 4—4, Figures 1 and 2.

Conductor 12, after it emerges from insulator 11, is offset as shown in Figure 2 and has secured to its outer end an electrode clamp comprising two washer-like portions 14 that are connected by means of a connector element 15, which holds them in spaced relation. A clamping screw 16 is threadedly connected with element 15 and serves to clamp the electrode 17 in position. Conductor 18, which is highly insulated by means of a flexible covering, is permanently connected with the rear end of conductor 12, and the joint is covered with suitable insulating material 19, such as a rubber tube, or some insulating tape. A short tubular section 20 telescopes over the rear end of handle 10 and forms an elongation of the handle. Section 20 may be readily removed when occasion requires and more particularly for the purpose of disconnecting conductor 21. For the type of electric welding referred to as "brazing" two electrodes are employed, and the holder, when used in this manner, is provided with a tubular bearing element 22 welded to its outer surface as shown in the drawing. A conductor 23 is inserted in the opening in member 22 so as to be in electrical contact with the handle and mounted for rocking movement. The rear end of conductor 23 is bent laterally and curved about the handle as indicated at 24. The outer end of handle 24 is provided with an insulating knob 25 that can be engaged by the thumb of the operator for the purpose of rocking conductor 23 in the elongated tubular bearing 22. The front end of conductor 23 is threaded, as indicated at 26 in Figure 6, and carries a lock nut 27. Secured to the front end of conductor 23 is an electrode clamp comprising two washer-like members 14a that are connected by means of a transverse member 15a which is provided with a threaded opening for clamping screw 16a. The electrode clamp comprising member 14a is connected by welding to an elongated nut 28. When the two electrodes are to be employed, member 28 is screwed onto the front end of conductor 23 and adjusted to the proper rotary position, after which it is secured in adjusted position by the lock nut 27. Electrodes 17 and 29 are now positioned in the openings in members 14 and 14a and clamped by the screws 16 and 16a, the parts being nor- March 23, 1948.    L. HEGY    2,438,283
SWITCHING SYSTEM
Filed Jan. 13, 1945    2 Sheets-Sheet 1

INVENTOR.
LOUIS HEGY
BY Ellwoodbury
ATTORNEY